S. SHAPIRO.
MILK HEATING APPARATUS.
APPLICATION FILED JAN. 8, 1910.
960,045.
Patented May 31, 1910.
2 SHEETS—SHEET 1.
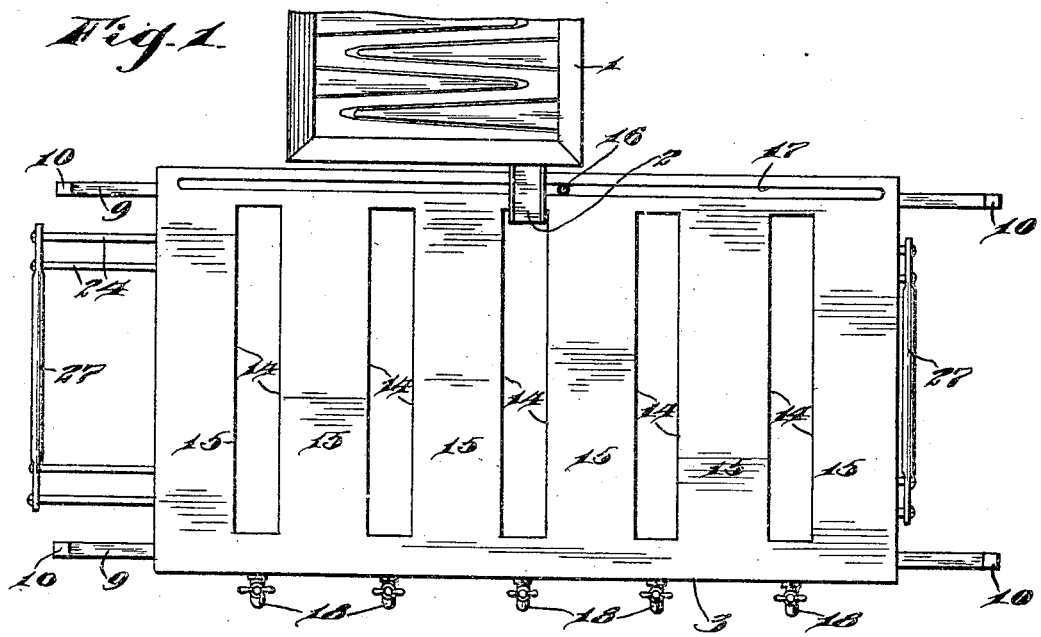
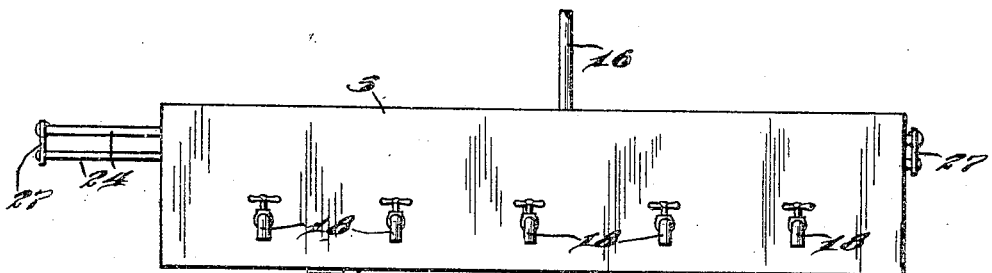
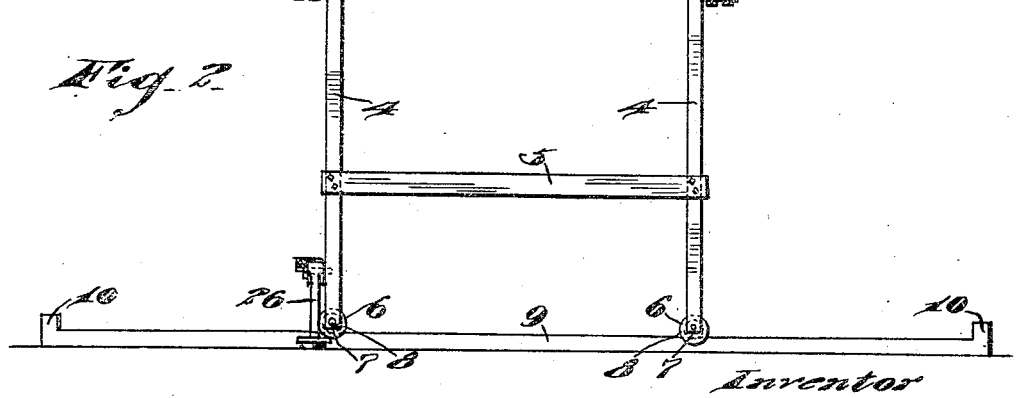
Witnesses
Theo. Rosemann.
R. H. Krenkel.
Inventor
Samuel Shapiro,
By Joshua R. H. Potts,
Attorney

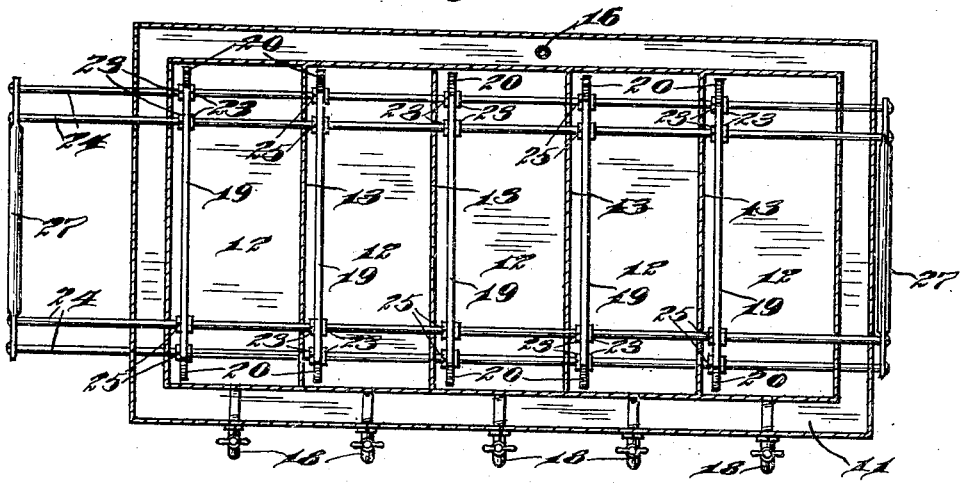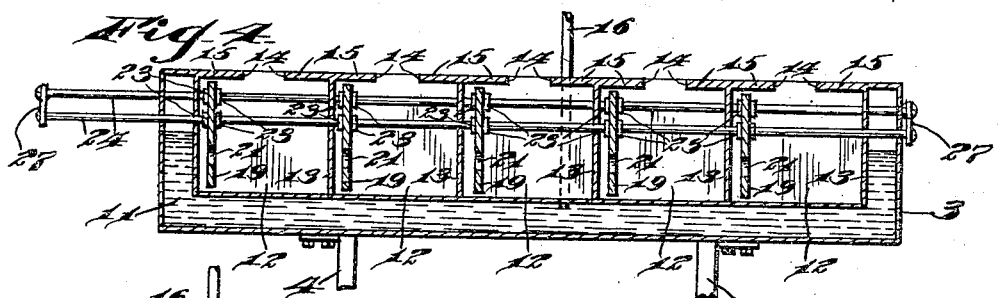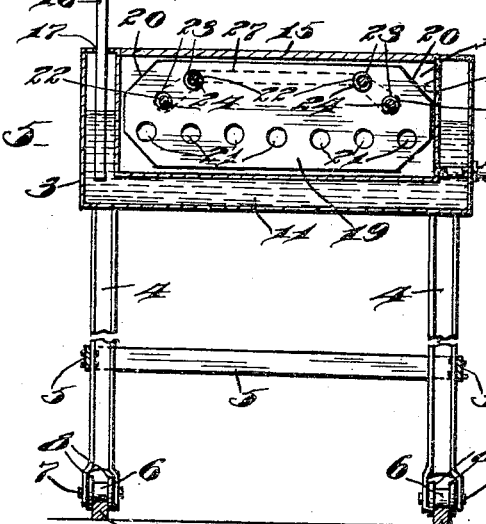

UNITED STATES PATENT OFFICE.

SAMUEL SHAPIRO, OF PHILADELPHIA, PENNSYLVANIA.

MILK-HEATING APPARATUS.

960,045.		Specification of Letters Patent.		Patented May 31, 1910.

Application filed January 8, 1910. Serial No. 537,041.

*To all whom it may concern:*

Be it known that I, SAMUEL SHAPIRO, a citizen of the United States, residing at Philadelphia, in the county of Philadelphia and State of Pennsylvania, have invented certain new and useful Improvements in a Milk-Heating Apparatus, of which the following is a specification.

My invention relates to improvements in a milk heating apparatus, the object of the invention being to provide an improved apparatus containing a plurality of milk receptacles or tanks, adapted to receive milk from a pasteurizer or sterilizer, and maintain the milk so received at the temperature desired for the desired length of time.

Most of the States of the United States have passed laws making certain requirements regarding the pasteurizing of milk; that is, they set certain standards to which dairymen must conform. For example, in Pennsylvania the law requires that milk must be pasteurized at a temperature of 155° F. and must be maintained for forty minutes at that temperature. In order to permit a pasteurizer to be utilized through which a continuous flow of milk is maintained to bring the milk to the desired temperature, my improved apparatus was devised, and its function is to receive the milk from the pasteurizer and maintain it at its desired temperature for the required length of time, without the necessity of stopping the operation of the pasteurizer, but enabling a continuous flow of milk therethrough. This is a very important feature, as it is well known that when a pasteurizer is stopped, and even though the milk does not flow through the same but for a short length of time, before a new supply can be passed through the pasteurizer the apparatus must be thoroughly cleaned, whereas if a continuous flow is permitted, it is not necessary to clean the pasteurizer until the entire operation is over.

The object therefore of my improved apparatus, is to provide a series of milk receiving tanks to receive in any and all of them, milk from the pasteurizer and maintain the milk at the temperature desired, and further to provide improved means for agitating the milk in the several tanks so as to prevent the formation of cream at the top of the milk, and which agitating means are so designed as to prevent any possibility of making butter of the cream.

With these and other objects in view, the invention consists in certain novel features of construction and combinations and arrangements of parts, as will be more fully hereinafter described and pointed out in the claims.

In the accompanying drawings: Figure 1 is a plan view illustrating my improvements. Fig. 2 is a view in front elevation of Fig. 1. Fig. 3 is a view in horizontal longitudinal section. Fig. 4 is a view in vertical longitudinal section. Fig. 5 is a view in vertical cross section, and Fig. 6 is a detail perspective view of one of the agitators.

1 represents a fragment of a pasteurizer, 2 the outlet spout therefrom, and 3 is my improved apparatus, which is of general rectangular form illustrated and supported upon legs 4, said legs being braced by lateral and longitudinal bars 5. The lower ends of these legs 4 are bifurcated and straddle wheels or rollers 6, which latter are supported upon journal pins 7 projecting through the bifurcated ends of the legs and through the wheels or rollers 6. These wheels or rollers are preferably made with flanges 8 at both ends, and are mounted to run upon rails 9, so as to facilitate the movement of the apparatus at right angles to the position of the pasteurizer, the ends of said rails 9 being turned up as shown at 10, to limit the movement of the apparatus, and these rails are of such a length that when moved to either extreme position, the apparatus will be in operative relation with the pasteurizer.

The apparatus, as above stated, is of general rectangular form, preferably made of sheet metal and forming a water receiving chamber 11. Inside of the water chamber a series of milk receiving tanks 12 are provided, these tanks being preferably formed of a single rectangular structure, smaller in all dimensions than the outer wall 3 of the apparatus, so that the water chamber 11 above referred to, not only extends below the bottom of the tanks, but also up the walls of the tanks, as illustrated most clearly in Figs. 3, 4, and 5, thus practically forming a water lining for the tanks, and the tanks are separated by transverse partitions 13, and have narrow or restricted openings 14 at their top, so that the upper walls 15 of the tanks extend longitudinally of the apparatus beyond the partition walls 13, for a purpose which will hereinafter appear.

As shown in Fig. 1, the apparatus is to be moved so that one of its openings 14 will be below the spout 2 of the pasteurizer and receive the milk from the pasteurizer, the openings 14 being of sufficient width to allow a free flow of milk from the pasteurizer to the tank. To heat the water in chamber 11 a steam supply pipe 16 being fixed with relation to the apparatus, is provided, and projects downward through a longitudinal slot 17 in the upper wall of chamber 11, near one edge of the apparatus. This steam pipe projects down into and is submerged in the water in chamber 11, and due to the slot 17 it maintains this position with relation to the water at any and all adjustments of the apparatus with relation to the pasteurizer, and a continuous supply of steam is forced into the water to maintain the water at the desired temperature, and therefore maintain the tanks at the desired temperature to keep the milk as hot as the law requires, and for the proper length of time.

Each of the tanks 12 is provided with an outlet cock or faucet 18, so tnat the milk from the tanks may be drawn off and cooled as may be desired.

To prevent creaming of the milk at the top in the several tanks 12, I provide in each tank an agitator 19, which is in the form of a strip or board of approximately the length and height of the tanks, and preferably having the corners cut off as shown at 20, and provided with perforations as shown at 21. These agitators are made with registering openings 22, around which collars 23 are secured and rods 24 are passed through all of these openings 22 in the agitators and through the partition walls and tanks, and extend outward through the ends of the apparatus and are connected at their ends by cross bars or handles 27. To prevent any movement of the agitators with relation to the rods, I preferably employ two rods at each side, located at an angle with relation to each other, so that the movement of the agitators against the resistance of the milk cannot change the relation of the agitators to the rods, but insure a strong, rigid construction and to secure the agitators against longitudinal movement on the rods, set screws 25 are located in the collars 23 and are jammed tight against the rods.

To prevent accidental movement of the apparatus while the agitators are being moved, I provide a friction clutch foot lever 26 pivoted to one of the legs so that when this foot lever is pressed down into contact with the floor, the apparatus is locked against movement, and when it is desired to move the apparatus it is necessary to press down the other end of the lever and release the friction holder.

The operation is as follows: The apparatus is preferably moved in starting, so that the spout 2 will register with the opening 14 above an end tank 12, and the milk from the pasteurizer will flow into this tank to fill the same to the desired level, it being understood that the steam from the pipe 16 heats the water in the chamber 11, and this hot water maintains the milk in the tank at the proper temperature. When the first tank receives its proper quota of milk, the apparatus is quickly moved so that the spout 2 will register with the next tank 12, and so on until as many of the tanks are filled as are desired. It will be noted that by providing a plurality of these tanks, that before the last one is filled, milk in the first one will be maintained at a temperature for a considerable length of time, long enough to comply with the requirements of the law, and hence while one tank is being filled from the pasteurizer, another tank may be emptied through its cock or faucet 18, so that when the apparatus has been moved in one direction to fill up all its tanks, the tanks which were first filled, having been emptied, the apparatus may be turned to the starting point, and the operation be practically a continuous one.

In order to prevent creaming of the milk at the top of the tanks, the operator from time to time, and from either end of the apparatus, moves all of the agitators 19 by means of handles 27 and rods 24, for it will be noted when the handles are drawn out or forced in, as the case may be, the agitators will be pulled through the milk in the tanks and the milk will flow around the agitator and through the perforations therein, and thoroughly mix the cream and milk, preventing the formation of cream at the top of the milk. This movement of the agitators has a tendency to force the milk against the side walls of the tanks and create a wave which forces upwardly, but due to the overlying portions 15 above referred to, such wave of milk is deflected back into the tank and is not forced out of the tank as would otherwise be the case. But this agitation is not of the kind that would be liable to churn the cream into butter, and it is especially designed to prevent doing this.

While my improved apparatus is designed to be used to receive the milk from the pasteurizer and maintain it at a temperature for a given length of time before being passed to the cooler, it is in no wise limited to any particular construction of pasteurizer or cooler, nor any particular location of such apparatuses, I hence consider myself at liberty to make such slight changes and modifications as may be required for the apparatus to render it adapted for use with different characters of pasteurizers and coolers, and further, if desired, any suitable form of covers may be provided for the different tanks, and I have omitted such covers for purposes of clearness of the drawings, and in fact the covers would have to be designed so as to make them operative in connection with the particular forms of pasteurizers and coolers employed.

Various slight changes might be made in the general form and arrangement of parts described without departing from my invention, and hence I do not restrict myself to the precise details set forth, but consider myself at liberty to make such changes and alterations as fairly fall within the spirit and scope of the appended claims.

Having thus described my invention what I claim as new and desire to secure by Letters Patent is:—

1. In an apparatus of the character described, the combination with a water chamber, of a plurality of parallel milk receiving tanks in the water of said water chamber, said water chamber having a longitudinal slot in its upper wall and a steam pipe projecting through said slot and having its open lower end in the water in said water chamber.

2. In an apparatus of the character described, the combination with a rectangular water chamber, of legs supporting the said chamber, rails, wheels or rollers on the lower ends of said legs, mounted to move on said rails, a series of milk receiving tanks projecting into said water chamber, and means for heating the water in said chamber.

3. In an apparatus of the character described, the combination with a chamber divided into a plurality of milk receiving tanks, an agitator located in each tank and rods connecting all of said agitators and projecting through the chamber and tanks, and handles on the ends of said rods outside of the chamber.

4. In an apparatus of the character described, the combination with a rectangular water chamber, of a milk chamber smaller in all dimensions than the water chamber and projecting into the water chamber, whereby a water jacket is provided around the said milk chamber, said milk chamber divided by transverse partitions into a plurality of milk receiving tanks, an upper wall across said chambers, said wall having an opening above each of the tanks and forming upper walls which project longitudinally of the apparatus and transversely of the tanks beyond the walls of the tanks, and agitators movable transversely of the tanks and longitudinally of the apparatus, whereby said top walls serve as deflectors to deflect the milk thrown up, back into the tanks.

5. In an apparatus of the character described, the combination with a rectangular water chamber, of a milk chamber smaller in all dimensions than the water chamber and projecting into the water chamber, whereby a water jacket is provided around the said milk chamber, said milk chamber divided by transverse partitions into a plurality of milk receiving tanks, an upper wall across said chambers, said wall having an opening above each of the tanks and forming upper walls which project longitudinally of the apparatus and transversely of the tanks beyond the walls of the tanks, and agitators movable transversely of the tanks and longitudinally of the apparatus, whereby said top walls serve as deflectors to deflect the milk thrown up back into the tank, and rods connecting all of said agitators and projecting through the end walls of the apparatus, and handles connecting said rods at their outer ends.

In testimony whereof I have signed my name to this specification in the presence of two subscribing witnesses.

SAMUEL SHAPIRO.

Witnesses:
BEATRICE HERMAN,
R. H. KRINKEL.